US007912070B1

(12) United States Patent
Choksi

(10) Patent No.: US 7,912,070 B1
(45) Date of Patent: Mar. 22, 2011

(54) SYSTEM AND METHOD FOR SEAMLESSLY SWITCHING A HALF-DUPLEX SESSION TO A FULL-DUPLEX SESSION

(75) Inventor: Ojas Thakor Choksi, Herndon, VA (US)

(73) Assignee: Nextel Communications Inc., Reston, VA (US)

( * ) Notice: Subject to any disclaimer, the term of this patent is extended or adjusted under 35 U.S.C. 154(b) by 621 days.

(21) Appl. No.: 11/485,216

(22) Filed: Jul. 12, 2006

(51) Int. Cl.
*H04L 12/28* (2006.01)

(52) U.S. Cl. .............. 370/395.52; 370/277; 455/509; 455/517; 455/552.1

(58) Field of Classification Search .............. 370/277, 370/279, 395.52; 455/426.1, 520, 422.1, 455/450, 509, 517, 552.1
See application file for complete search history.

(56) References Cited

U.S. PATENT DOCUMENTS

| 4,870,408 | A |   | 9/1989  | Zdunek et al. |          |
|-----------|---|---|---------|---------------|----------|
| 5,442,809 | A |   | 8/1995  | Diaz et al.   |          |
| 5,483,465 | A | * | 1/1996  | Grube et al.  | 340/7.41 |
| 5,568,511 | A |   | 10/1996 | Lampe         |          |
| 5,710,591 | A |   | 1/1998  | Bruno et al.  |          |
| 5,818,836 | A |   | 10/1998 | DuVal         |          |
| 5,850,611 | A |   | 12/1998 | Krebs         |          |
| 5,884,196 | A |   | 3/1999  | Lekven et al. |          |
| 5,936,964 | A |   | 8/1999  | Valko et al.  |          |
| 5,983,099 | A |   | 11/1999 | Yao et al.    |          |
| 6,014,556 | A |   | 1/2000  | Bhatia et al. |          |
| 6,032,051 | A |   | 2/2000  | Hall et al.   |          |
| 6,041,241 | A |   | 3/2000  | Willey        |          |
| 6,119,017 | A |   | 9/2000  | Cassidy et al.|          |
| 6,178,323 | B1|   | 1/2001  | Nagata        |          |
| 6,381,467 | B1|   | 4/2002  | Hill et al.   |          |
| 6,490,452 | B1|   | 12/2002 | Boscovic et al.|         |
| 6,526,377 | B1|   | 2/2003  | Bubb          |          |
| 6,662,010 | B1| * | 12/2003 | Tseitlin et al.| 455/426.1|
| 2002/0055364 | A1 | | 5/2002 | Wang et al. | |
| 2002/0071445 | A1 | | 6/2002 | Wu et al. | |
| 2002/0145990 | A1 | | 10/2002 | Sayeedi | |
| 2002/0147818 | A1 | | 10/2002 | Wengrovitz | |

(Continued)

FOREIGN PATENT DOCUMENTS

EP  0 817 457  1/1998

(Continued)

OTHER PUBLICATIONS

U.S. Appl. No. 10/903,302, filed Jul. 31, 2004, Tillet.

(Continued)

*Primary Examiner* — Fan Tsang
*Assistant Examiner* — Simon King

(57) ABSTRACT

A communication system that is particularly suited to switch a half duplex session to a full duplex session. The system includes a dispatch call controller that sets up a half duplex session; and a VoIP server that receives a request to switch the half duplex session to a full duplex session; forwards the request to the target subscriber unit; receives an acceptance of the request; and sets up the full duplex session between the subscriber units. In another embodiment, the dispatch call controller receives the request to switch to the full duplex session; forwards the request to the target subscriber unit; receives an acceptance of the request; and instructs the VoIP server to set up the full duplex session. In yet another embodiment, a service broker receives the request, instructs the VoIP server to set up the full duplex session, and instructs the dispatch call controller to terminate the half duplex session.

20 Claims, 11 Drawing Sheets

U.S. PATENT DOCUMENTS

| | | | |
|---|---|---|---|
| 2002/0172165 A1 | 11/2002 | Rosen et al. | |
| 2002/0172169 A1 | 11/2002 | Rosen et al. | |
| 2002/0173325 A1 | 11/2002 | Rosen et al. | |
| 2002/0173326 A1 | 11/2002 | Rosen et al. | |
| 2002/0173327 A1 | 11/2002 | Rosen et al. | |
| 2002/0177461 A1 | 11/2002 | Rosen et al. | |
| 2002/0191583 A1 | 12/2002 | Harris et al. | |
| 2003/0008657 A1 | 1/2003 | Rosen et al. | |
| 2003/0021264 A1 | 1/2003 | Zhakov et al. | |
| 2004/0228292 A1* | 11/2004 | Edwards | 370/277 |
| 2006/0019654 A1* | 1/2006 | Farrill | 455/426.1 |
| 2006/0023649 A1* | 2/2006 | Tillet et al. | 370/310 |
| 2006/0079262 A1* | 4/2006 | Harris et al. | 455/520 |
| 2006/0172754 A1* | 8/2006 | Shin et al. | 455/518 |
| 2006/0221968 A1* | 10/2006 | Razdan et al. | 370/392 |
| 2007/0021132 A1* | 1/2007 | Jin et al. | 455/518 |
| 2007/0140150 A1* | 6/2007 | Beck et al. | 370/279 |
| 2007/0140255 A1* | 6/2007 | Gautier et al. | 370/395.5 |
| 2007/0140299 A1* | 6/2007 | Hofmann et al. | 370/486 |

FOREIGN PATENT DOCUMENTS

EP     0 984 608     3/2000

OTHER PUBLICATIONS

U.S. Appl. No. 10/903,092, filed Jul. 31, 2004, Tillet.
U.S. Appl. No. 11/485,087, filed Jul. 12, 2006, Choksi,
International Search Report from International Application No. PCT/US02/31411, dated Mar. 4, 2003.
International Search Report from International Application No. PCT/US02/29575, dated Dec. 10, 2002.
International Search Report from International Application No. PCT/US02/36055, dated Apr. 10, 2003.
International Search Report from International Application No. PCT/US03/03021, dated Jun. 18, 2003.
International Search Report from International Application No. PCT/US03/02950, dated Nov. 6, 2003.
U.S. Appl. No. 10/277,465, filed Oct. 22, 2002 entitled "Method for Call Setup Using Short Data Bursts".
$3^{rd}$ Generation Partnership Project 2 "3GPP2", "Fast Call Set-Up," Version 1.0, Apr. 15, 2002.
Mobile Tornado, http://www.mobiletornado.com/products_iprsptt.html, printed from the World Wide Web on Jan. 27, 2003.
"Qualcomm Chats Up 'Push-to-Tallk'", http://siliconvalley.internet.com/news/print.php/953261, printed from the World Wide Web on Jan. 27, 2003.
Schulzrinne and Rosenberg, SIP Caller Preferences and Callee Capabilities, Internet Engineering Task Force, Internet Draft, Oct. 22, 1999.
Vakil et al., "Host Mobility Protocol Extending SIP to 3G-IP Networks," Internet Engineering Task Force, Internet Draft, Oct. 1999.
Campbell and Sparks, "Control of Service Context Using SIP Request—URI", Networking Working Group, Apr. 2001.
Ericsson, www.telecomcorridor,com/wireless%20horizons/1Coyne.pdf, printed from the World Wide Web on Jun. 27, 2001.
Dirk Kutscher/Jorg Ott, "The Message Bus—A Communication and Integration Infrastructure for Component-Based Systems," White Paper, Jan. 2000.
Ott et al., "A Message Bus for Local Coordination," Network Working Group, Internet-Draft, May 30, 2001.
TR45, Medium Access Control (MAC) Standard for cdma2000 Spread Spectrum System, IS-2000-3, Jul. 12, 1999.
$3^{rd}$ Generation Partnership Project 2 '3GPP2', "Interoperability Specification (IOS) for CDMA 2000 Access Network Interfaces—Part 3 Features," Nov. 2001.
Perkins, "IP Mobility Support," Internet Engineering Task Force Request for Comment 2002, Oct. 1996.
Perkins, "IP Encapsulation within IP," Internet Engineering Task force Request for Comments 2003, Oct. 1996.
Perkins, "Minimal Encapsulation with in IP," Internet Engineering Task Force Request for Comments 2004, Oct. 1996.
Solomon, "Applicability Statement for IP Mobility Support," Internet Engineering Task Force Request for Comments 2005, Oct. 1996.
Handley, et al., "SDP: Session Description Protocol," Internet Engineering Task Force Request for Comment 2327, Apr. 1998.
Handley, et al., "SIP: Session Initiation Protocol," Internet Engineering Task Force Request for Comment 2543, Mar. 1999.
Fielding et al., "Hypertext Transfer Protocol—HTTP/1.1," Internet Engineering Task Force Request for Comment 2616, Jun. 1999.
Rigney et al., "Remote Authentication Dial in User Service (RADIUS)," Internet Engineering Task Force Request for Comment 2865, Jun. 2000.
Rigney, "RADIUS Accounting," Internet Engineering Task Force Request for Comment 2866, Jun. 2000.
OMA, Discussion and definitions on PoC Floor Control, Input Contribution, Doc #OMA-REQ-2003-0375-PoC__Floor__Control, Jun. 2, 2003.
OMA, "PoC Use case: Mobile—PC Example," Input Contribution, Doc #OMA-REQ-2003-0323 PoC Mobile-PC use case, May 5, 2003.
OMA, "PoC Use case: Multimedia Group Call Example," Input Contribution, Doc #OMA-REQ-2003-0306-PoC Use Case-group-multimedia-scenario, May 6, 2003.
OMA, "PoC Use case: Examples of User Requirements," Input Contribution, Doc #OMA-REQ-2003-0305-Poc Use Case, May 6, 2003.
OMA, "Inputs for PoC Requirements Document," Input Contribution, Doc #OMA-REQ-2003-0367-PoC__Input__Motorola, May 29, 2003.
Oma, "Push to Walk over Cellular (PoC)," Version 0.1.6, May 12, 2003.

* cited by examiner

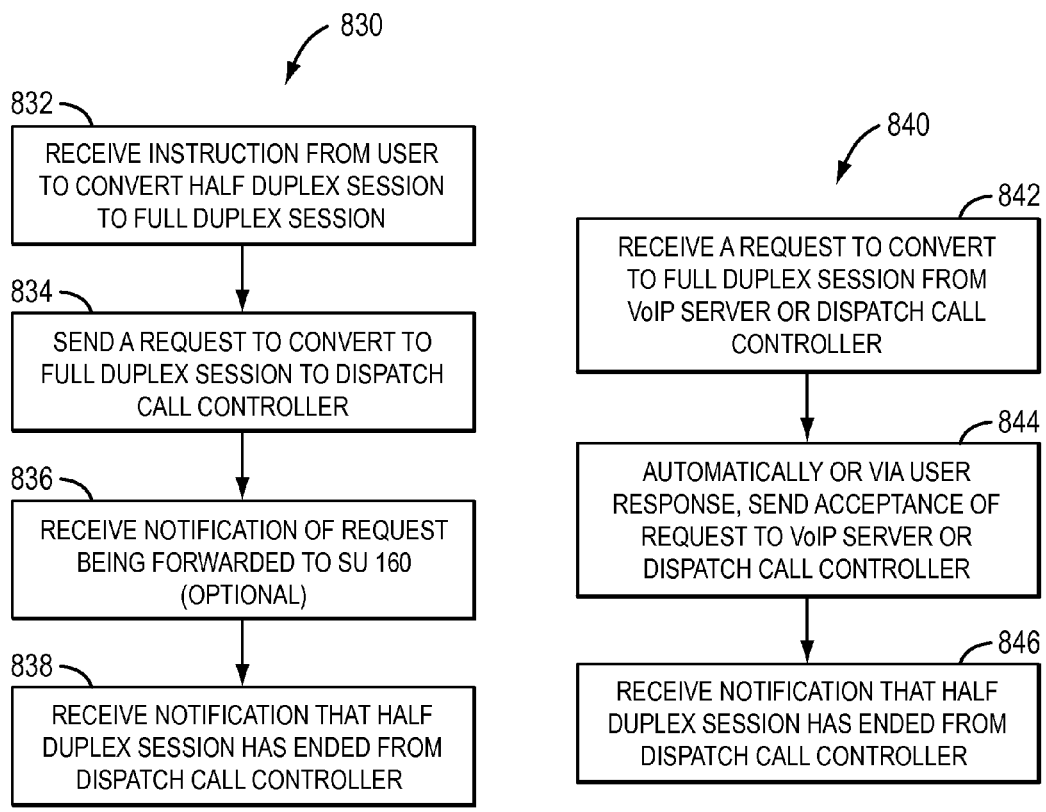

SYSTEM AND METHOD FOR SEAMLESSLY SWITCHING A HALF-DUPLEX SESSION TO A FULL-DUPLEX SESSION

CROSS REFERENCE TO A RELATED APPLICATION

This application is related to patent application entitled "System and Method for Seamlessly Switching a Full-Duplex Session to a Half-Duplex Session," filed concurrently with this application.

FIELD OF THE INVENTION

This invention relates to wireless communication systems, and in particular, to a system and method for seamlessly switching a half-duplex communication session to a full-duplex communication session.

BACKGROUND OF THE INVENTION

Wireless communication systems have become increasingly popular over the last decade. Such systems allow users to communicate with each other in various modes. For example, some systems allow users to communicate with each other by way of a full-duplex voice communication link, where the link is allocated to all parties for transmitting and receiving voice communications simultaneously (e.g., a cellular or interconnect communication). Other systems allow users to communicate with each other by way of a half-duplex voice communication link, where the link is allocated to a single party at a time for transmitting voice communications (e.g., a dispatch communication).

In many situations, a user initiates a communication with one or more users in a particular mode, for example, half-duplex mode or full-duplex mode, but after the communication commences, it becomes apparent to the users that the current mode of communication is not the most desirable. For example, a calling party initiates a half-duplex call with a target party for the purpose of asking the target party some very short questions. Such call consisting of short questions is typically suitable for half-duplex communication. After several conversations going back and forth in a half-duplex fashion, the parties realize that it would be more desirable to communicate in a full-duplex mode. In such situation and using prior art wireless communication systems, the parties need to terminate the half-duplex call and initiate the commencement of a new full-duplex call.

Accordingly, there is a need for a wireless communication system and method that allow for seamless switching from half-duplex mode to full-duplex mode full-duplex. This would eliminate the need for the parties to terminate the current half-duplex call and to initiate the commencement of a full-duplex call.

SUMMARY OF THE INVENTION

An aspect of the invention relates to an exemplary communication system that is particularly suited to switch a current half duplex communication session to a full duplex communication session upon receiving a request and an acceptance by the initiating and target parties, respectively. The communication system comprises a network; a dispatch call controller coupled to the network, wherein the dispatch call controller is adapted to set up a half duplex communication session between first and second subscriber units (SUs). The communication system further comprises a voice over Internet Protocol (VoIP) server coupled to the network, wherein the VoIP server is adapted to receive a request to switch the half duplex communication session to a full duplex communication session from the first subscriber unit (SU) by way of the network, while the half duplex communication session is active; forward the request to the second subscriber unit (SU) by way of the network; receive an acceptance of the request from the second subscriber unit (SU) by way of the network; and set up the full duplex communication session between the first and second subscriber units (SUs).

Another aspect of the invention relates to another exemplary communication system that is particularly suited to switch a current half duplex communication session to a full duplex communication session upon receiving a request and an acceptance by the initiating and target parties, respectively. The communication system comprises a network, a VoIP server coupled to the network, and a dispatch call controller coupled to the network. The dispatch call controller is adapted to set up a half duplex communication session between first and second subscriber units (SUs); receive a request to switch the half duplex communication session to a full duplex communication session from the first subscriber unit (SU) by way of the network, while the half duplex communication session is active; forward the request to the second subscriber unit (SU) by way of the network; receive an acceptance of the request from the second subscriber unit (SU) by way of the network; and send an instruction to the VoIP server to set up the full duplex communication.

Yet another aspect of the invention relates to a communication system that is particularly suited to switch a current half duplex communication session to a full duplex communication session upon receiving a request and an acceptance by the initiating and target parties, respectively. The communication system comprises a dispatch call controller adapted to set up a half duplex communication session between first and second subscriber units (SUs); a VoIP server adapted to set up a full duplex communication session between the first and second subscriber units (SUs); and a service broker adapted to receive a request to switch the half duplex session to the full duplex communication session; instruct the VoIP server to set up the full duplex communication session; and instruct the dispatch call controller to terminate the half duplex communication session.

Still another aspect of the invention relates to an exemplary method of switching a half duplex communication session to a full duplex communication session. The method comprises receiving a request to switch a half duplex communication session to a full duplex communication session from a first subscriber unit (SU); forwarding the request to a second subscriber unit (SU); receiving an acceptance of the request from the second subscriber unit (SU); and setting up the full duplex communication session between the first and second subscriber units (SUs) if the acceptance of the request is received.

Other aspects, features, and techniques of the invention will be apparent to one skilled in the relevant art in view of the following detailed description of the invention.

BRIEF DESCRIPTION OF THE DRAWINGS

FIG. 8C illustrates a flow diagram of another exemplary method of initiating a switch from a half duplex communication session to a full duplex communication session performed by the subscriber unit (SU) in accordance with another embodiment of the invention; and FIG. 8D illustrates a flow diagram of another exemplary method of responding to a request to switch from a half duplex communication session to a full duplex communication session performed by the subscriber unit (SU) in accordance with another embodiment of the invention.

DETAILED DESCRIPTION OF THE EXEMPLARY EMBODIMENTS

Figure 1:
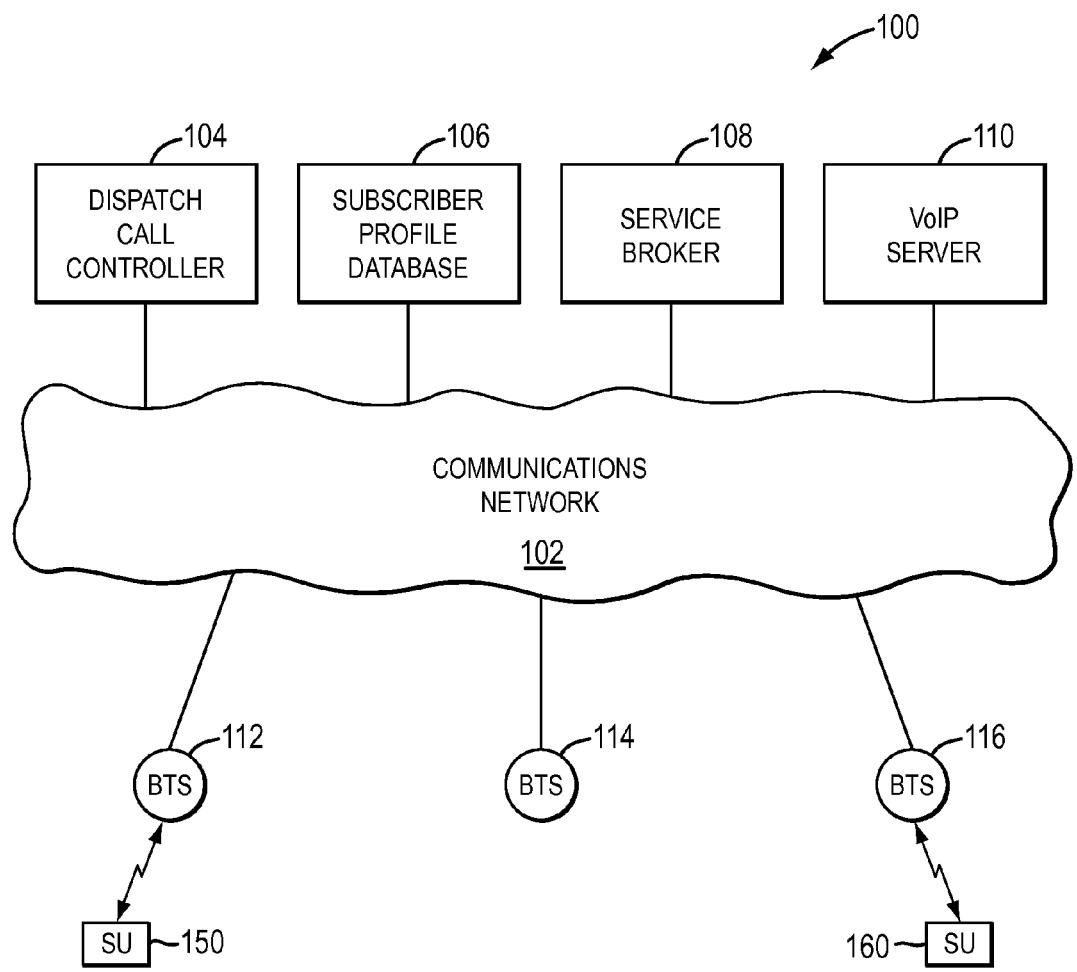
FIG. 1 illustrates a block diagram of an exemplary wireless communication system in accordance with an embodiment of the invention.

FIG. 1 illustrates a block diagram of an exemplary wireless communication system 100 in accordance with an embodiment of the invention. As discussed in more detail below, the wireless communication system 100 is particularly suited for converting an on-going half duplex communication session to a full duplex communication session.

In particular, the wireless communication system 100 comprises a communications network 102, a dispatch call controller (DCC) 104 coupled to the communications network 102, a subscriber profile database 106 coupled to the communications network 102, a service broker 108 coupled to the communications network 102, a voice over Internet Protocol (VoIP) server 110 coupled to the communications network 102, and a plurality of base transceiver stations (BTS) 112, 114, and 116 coupled to the communications network 102.

More specifically, the communications network 102 facilitates communications between the various devices of the network, including the dispatch call controller 104, subscriber profile database 106, service broker 108, VoIP server 110, and the base transceiver stations (BTS) 112, 114, and 116. The communications network 102 may be based on any type of technology and/or protocol. For example, the communications network 102 may be based on internet protocol (IP), asynchronous transfer mode (ATM) protocol, frame relay, proprietary protocols, any combination thereof, and/or others.

The dispatch call controller 104 assists in the set up, control (e.g., channel floor control), and termination of half duplex communication sessions. In addition, as discussed in more detail below, the dispatch call controller 104 assists in the switching of half duplex communication sessions to full duplex communication sessions. The VoIP server 110 assists in the set up, control, and termination of full duplex communication sessions. In addition, as discussed in more detail below, the VoIP server 110 assists in the switching of half duplex communication sessions to full duplex communication sessions.

The subscriber profile database 106 receives, stores, and provides subscriber profile information related to subscriber units (SUs). In this example, the subscriber profile information relates to whether the parties to a half duplex communication session have subscribed for the service of having their half duplex communication session switched to a full duplex communication session by the communication system 100. If the parties have subscribed to this service, the communication system 100 is able to switch the half duplex communication session to the requested full duplex communication session. If the parties have not subscribed to the service, the communication system 100 denies the switch request. The service broker 108 serves as an intermediary between the dispatch call controller 104 and the VoIP server 110, and assists in the switching of half duplex communication sessions to full duplex communication sessions.

The wireless communication system 100 provides wireless communication services to a plurality of subscriber units (SUs), two of which are shown as SUs 150 and 160 assigned to communicate with the network 102 via base transceiver stations (BTS) 112 and 116, respectively. Although subscriber units (SUs) described herein communicate with the communication system 100 via a wireless medium, it shall be understood that subscriber units (SUs) may also communicate with the system via a wired network (such as the Internet), as in the case, for example, of a dispatch-to-desktop device having half- and full-duplex communication capabilities. A subscriber unit (SU) may be any device capable of communicating in both half duplex and full duplex modes.

The following describes several exemplary methods of switching a half duplex communication session to a full duplex communication session in accordance with exemplary embodiments of the invention. Also provided is a detailed discussion of an exemplary VoIP server, dispatch call controller, service broker, and subscriber unit (SU) and their respective operations relating to the switching of a half duplex communication session to a full duplex communication session.

Figure 2:
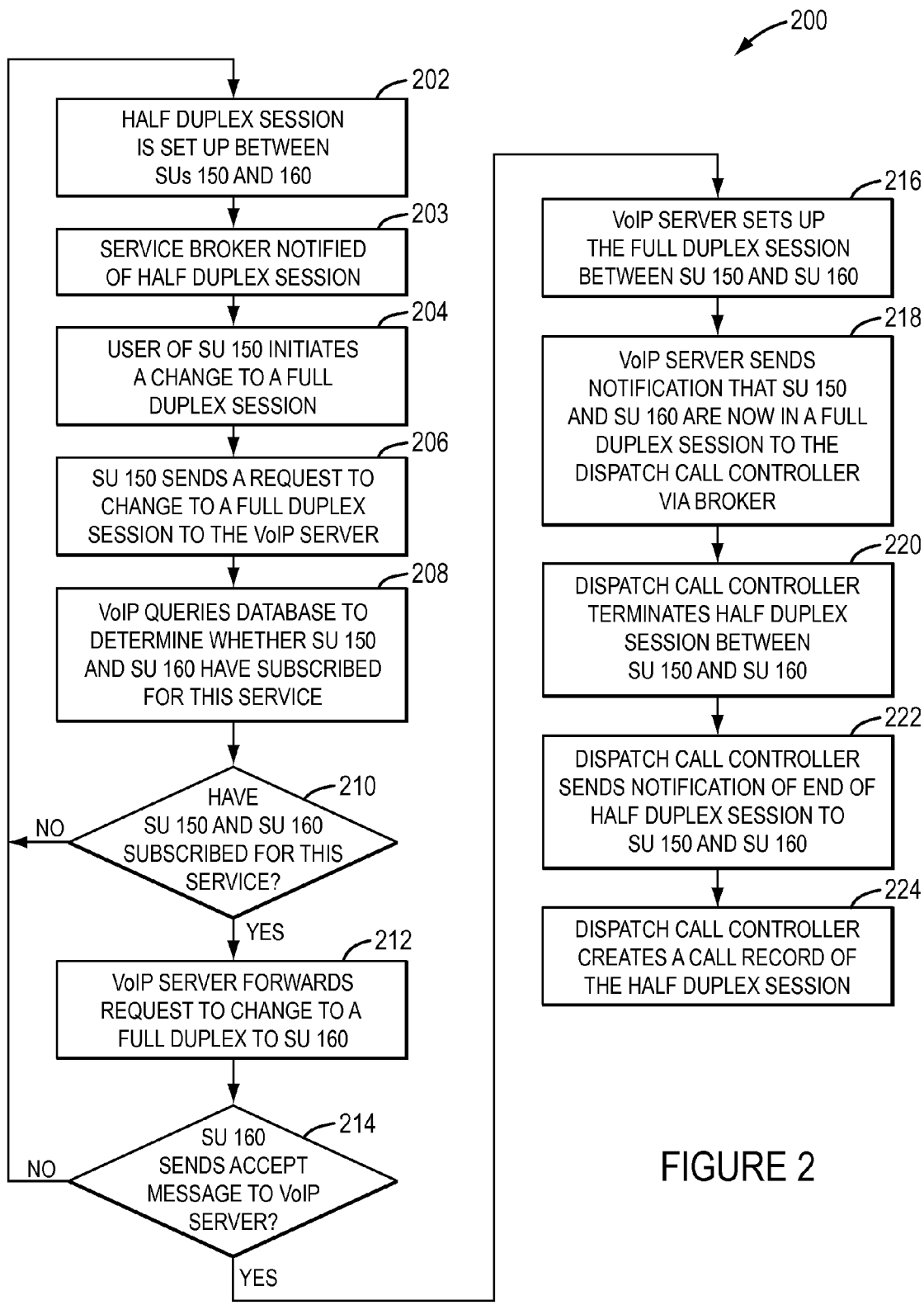
FIG. 2 illustrates a flow diagram of an exemplary method of switching a half duplex communication session to a full duplex communication session in accordance with another embodiment of the invention.

FIG. 2 illustrates a flow diagram of an exemplary method 200 of switching a half duplex communication session to a full duplex communication session in accordance with another embodiment of the invention. In this example, the wireless communication system 100 has set up a half duplex communication session between SUs 150 and 160. Also, in this example, SU 150 initiates a switch of the half duplex communication session to a full duplex communication session. Further, in this example, the VoIP server 110 handles the request to switch the half duplex communication session to the full duplex communication session.

According to the method 200, a half duplex communication session is set up between SUs 150 and 160 (block 202). This may be accomplished in any of a number of ways, depending on the protocol used by the wireless communication system 100. For example, the originating SU 150, in response to the user pressing the dispatch call button, sends a dispatch call request to the dispatch call controller 104 via the base transceiver station (BTS) 112 and communications network 102. In response, the dispatch call controller 104 sends a page to the target SU 160 via the network 102 and the base transceiver station (BTS) 116. If the target SU 160 is available for the call, which in this example it is, the target SU 160 sends a page response to the dispatch call controller 104 via the base transceiver station (BTS) 116 and the network 102. In response, the dispatch call controller 104 sets up the half duplex communication session. The dispatch call controller 104 may send a notification of the half duplex communication session to the service broker 108 via the network 102 (block 203).

After the half duplex communication session has been set up, and the SUs 150 and 160 most likely have exchanged several dispatch communications via this session, the user of SU 150 initiates a switch of the half duplex communication session to a full duplex communication session (block 204). The SU 150 may have a physical and/or software button which the user can activate to initiate this switch. In a typical case, a user may want to switch a half duplex communication session to a full duplex communication session when the conversation has become more elaborate, which is better suited for full duplex than half duplex.

In response to the user initiating the switch from half duplex communication session to full duplex communication session, the SU 150 sends a request to change to a full duplex session to the VoIP server 110 by way of the base transceiver station (BTS) 112 and network 102 (block 206). In response to receiving the request, the VoIP server 110 queries the subscriber profile database 106 to determine whether the SUs 150 and/or 160 have subscribed to the half-to-full duplex switching service (block 208). As an example, the VoIP server 110 sends a subscriber profile request to the subscriber profile database 106 via the network 102, and the subscriber profile database 106 sends a response to the subscriber profile request to the VoIP server 110 via the network 102. The response indicates the subscription status of the SUs 150 and/or 160 for the half-to-full duplex switching service. Alternatively, if the originating SU 150 does not have a subscription to the half-to-full duplex switching service, it may not have a hard or software button available to initiate the switching request.

If the VoIP server 110 determines that the SUs 150 and/or 160 have not subscribed to the half-to-full duplex switching service (block 210), the current half duplex communication session continues as specified in block 202. Otherwise, if the VoIP server 110 determines that the SUs 150 and/or 160 have subscribed to the half-to-full duplex switching service (block 210), the VoIP server 110 forwards the request to the target SU 160 via the network 102 and the base transceiver station (BTS) 116 (block 212). If the target SU 160 does not accept the request to switch to the full duplex session (e.g., by sending a message denying the request to the VoIP server 110 or not sending a message accepting the request to the VoIP server 110 within a predetermined time period) (block 214), the current half duplex session continues as specified in block 202. If the target SU 160 does not have a subscription to the half-to-full duplex switching service, it may not have a hard or software button available to accept the switching request.

Otherwise, if the target SU 160 accepts the request (e.g., by automatically or user initiating the sending of a message accepting the request to the VoIP server 110 via the base transceiver station (BTS) 116 and network 102), the VoIP server 110 sets up the full duplex communication session between the SUs 150 and 160 (block 216). The VoIP server 110 then sends a notification of the set up of the full duplex communication session between the SUs 150 and 160 to the dispatch call controller 104 via the network 102 and optionally via the service broker 108 (block 218). Alternatively, this notification may be sent from any of the SUs 150 and 160 to the dispatch call controller 104.

In response to receiving the notification, the dispatch call controller 104 terminates the half duplex communication session between the SUs 150 and 160 (block 220). The dispatch call controller 104 then sends a notification of the end of the half duplex communication session to the SUs 150 and 160 (block 222). The dispatch call controller 104 then creates a call record for the half duplex communication session for billing and/or other purposes (block 224).

Figure 3:
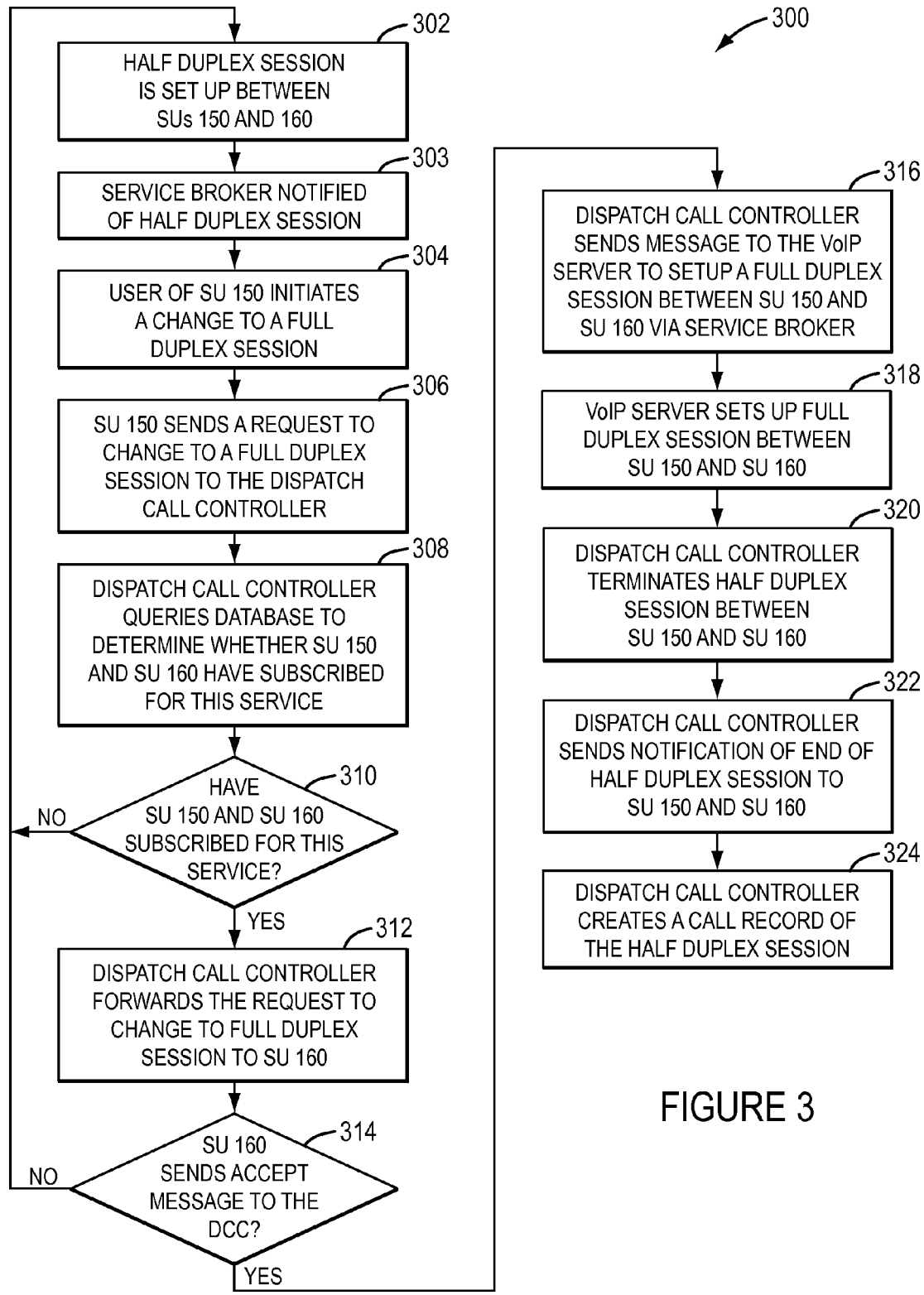
FIG. 3 illustrates a flow diagram of another exemplary method of switching a half duplex communication session to a full duplex communication session in accordance with another embodiment of the invention.

FIG. 3 illustrates a flow diagram of an exemplary method 300 of switching a half duplex communication session to a full duplex communication session in accordance with another embodiment of the invention. In this example, the wireless communication system 100 has set up a half duplex communication session between SUs 150 and 160. Also, in this example, SU 150 initiates a switch of the half duplex communication session to a full duplex communication session. Further, in this example, the dispatch call controller 104 handles the request to switch the half duplex session to the full duplex session.

According to the method 300, a half duplex communication session is set up between SUs 150 and 160 (block 302). This may be accomplished in any of a number of ways, as discussed above. The dispatch call controller 104 may send a notification of the half duplex communication session to the service broker 108 via the network 102 (block 303). After the half duplex communication session has been set up, and the SUs 150 and 160 most likely have exchanged several dispatch communications via this session, the user of SU 150 initiates a switch of the half duplex communication session to a full duplex communication session (block 304). In response to the user initiating the switch from half duplex session to full duplex session, the SU 150 sends a request to change to a full duplex session to the dispatch call controller 104 by way of the base transceiver station (BTS) 112 and network 102 (block 306).

In response to receiving the request, the dispatch call controller 104 queries the subscriber profile database 106 to determine whether the SUs 150 and/or 160 have subscribed to the half-to-full duplex switching service (block 308). As an example, the dispatch call controller 104 may send a subscriber profile request to the subscriber profile database 106 via the network 102, and the subscriber profile database 106 sends a response to the subscriber profile request to the dispatch call controller 104 via the network 102. The response indicates the subscription status of the SUs 150 and/or 160 for the half-to-full duplex switching service. Alternatively, if the originating SU 150 does not have a subscription to the half-to-full duplex switching service, it may not have a hard or software button available to initiate the switching request.

If the dispatch call controller 104 determines that the SUs 150 and/or 160 have not subscribed to the half-to-full duplex switching service (block 310), the current half duplex session continues as specified in block 302. Otherwise, if the dispatch call controller 104 determines that the SUs 150 and/or 160 have subscribed to the half-to-full duplex switching service (block 310), the dispatch call controller 104 forwards the request to the target SU 160 via the network 102 and the base transceiver station (BTS) 116 (block 312). If the target SU 160 does not accept the request to switch to the full duplex session (e.g., by sending a message denying the request to the dispatch call controller 104 or not sending a message accepting the request to the dispatch call controller 104 within a predetermined time period) (block 314), the current half duplex session continues as specified in block 302. If the target SU 160 does not have a subscription to the half-to-full duplex switching service, it may not have a hard or software button available to accept the switching request.

Otherwise, if the target SU 160 accepts the request (e.g., by automatically or user initiating the sending of a message accepting the request to the dispatch call controller 104 via the base transceiver station (BTS) 116 and network 102), the dispatch call controller 104 sends a message to set up a full duplex session to the VoIP server 110 via the network 102 and optionally via the service broker 108 (block 316). Alternatively, the message to set up the full duplex session may be sent from any of the SUs 150 and 160. In response, the VoIP server 110 then sets up the full duplex communication session between the SUs 150 and 160 (block 318). The VoIP server 110 of any of the SUs 150 and 160 may send a message to the dispatch call controller 104 to terminate the half duplex session. In response to the message, the dispatch call controller 104 terminates the half duplex session between the SUs 150 and 160 (block 320). The dispatch call controller 104 then sends a notification of the end of the half duplex session to the SUs 150 and 160 (block 322). The dispatch call controller 104 then creates a call record for the half duplex session for billing and/or other purposes (block 324).

Figure 4:
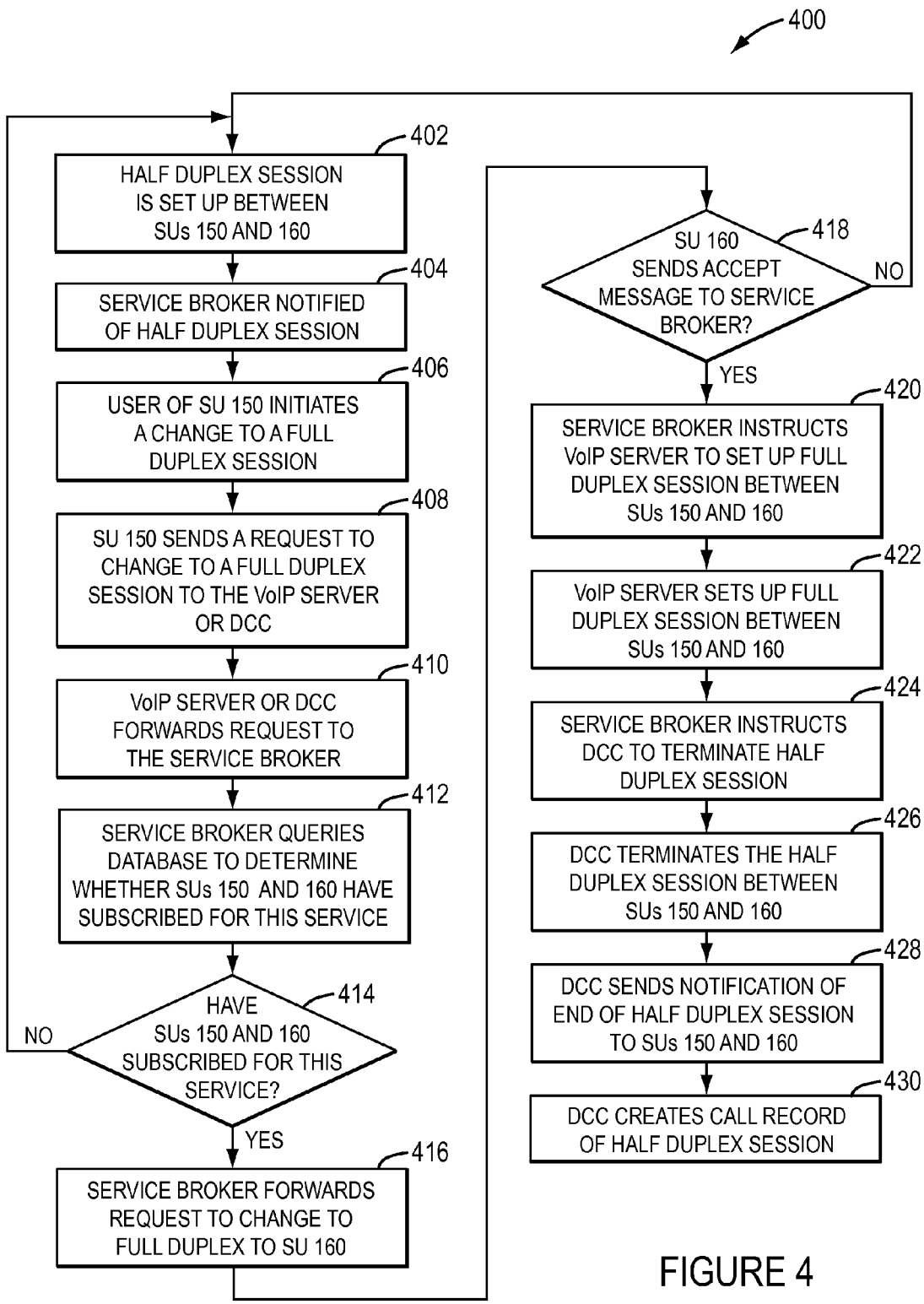
FIG. 4 illustrates a flow diagram of another exemplary method of switching a half duplex communication session to a full duplex communication session in accordance with another embodiment of the invention.

FIG. 4 illustrates a flow diagram of an exemplary method 400 of switching a half duplex communication session to a full duplex communication session in accordance with another embodiment of the invention. In this example, the wireless communication system 100 has set up a half duplex communication session between SUs 150 and 160. Also, in this example, SU 150 initiates a switch of the half duplex communication session to a full duplex communication session. Further, in this example, the service broker 108 handles the request to switch the half duplex session to the full duplex session.

According to the method 400, a half duplex communication session is set up between SUs 150 and 160 (block 402). This may be accomplished in any of a number of ways, as discussed above. The dispatch call controller 104 may send a notification of the half duplex communication session to the service broker 108 via the network 102 (block 404). After the half duplex communication session has been set up, and the SUs 150 and 160 most likely have exchanged several dispatch communications via this session, the user of SU 150 initiates a switch of the half duplex communication session to a full duplex communication session (block 406). In response to the user initiating the switch from half duplex session to full duplex session, the SU 150 sends a request to change to a full duplex session to the VoIP server 110 or the dispatch call controller 104 by way of the base transceiver station (BTS) 112 and network 102 (block 408). The VoIP server 110 or dispatch call controller 104 forwards the request to the service broker 108 via the network 102 (block 410).

In response to receiving the request, and if the subscription for SU 150 and/or SU 160 is not locally available, the service broker 108 queries the subscriber profile database 106 to determine whether the SUs 150 and/or 160 have subscribed to the half-to-full duplex switching service (block 412). As an example, the service broker 108 may send a subscriber profile request to the subscriber profile database 106 via the network 102, and the subscriber profile database 106 sends a response to the subscriber profile request to the service broker 108 via the network 102. The response indicates the subscription status of the SUs 150 and/or 160 for the half-to-full duplex switching service.

If the service broker 108 determines that the SUs 150 and/or 160 have not subscribed to the half-to-full duplex switching service (block 414), the current half duplex session continues as specified in block 402. Otherwise, if the service broker 108 determines that the SUs 150 and/or 160 have subscribed to the half-to-full duplex switching service (block 414), the service broker 108 forwards the request to the target SU 160 via the network 102 and the base transceiver station (BTS) 116 (block 416). If the target SU 160 does not accept the request to switch to the full duplex session (e.g., by sending a message denying the request to the service broker 108 or not sending a message accepting the request to the service broker within a predetermined time period) (block 418), the current half duplex session continues as specified in block 402.

Otherwise, if the target SU 160 accepts the request (e.g., by automatically or user initiating the sending of a message accepting the request to the service broker 108 via the base transceiver station (BTS) 116 and network 102), the service broker 108 sends a message to set up a full duplex session to the VoIP server 110 via the network 102 (block 420). Alternatively, this message to set up the full duplex session may be sent from any of the SUs 150 and 160. In response, the VoIP server 110 then sets up the full duplex communication session between the SUs 150 and 160 (block 422). Upon receiving an acknowledgement from the VoIP server 110 that the full duplex session has been setup, the service broker 108 also sends a message to terminate the half duplex communication session to the dispatch call controller 104 via the network 102 (block 424). Alternatively, the message to terminate the half duplex session may be sent from any of the SUs 150 and 160. In response, the dispatch call controller 104 terminates the half duplex session between the SUs 150 and 160 (block 426). The dispatch call controller 104 then sends a notification of the end of the half duplex session to the SUs 150 and 160 (block 428). The dispatch call controller 104 then creates a call record for the half duplex session for billing and/or other purposes (block 430).

Figure 5A:
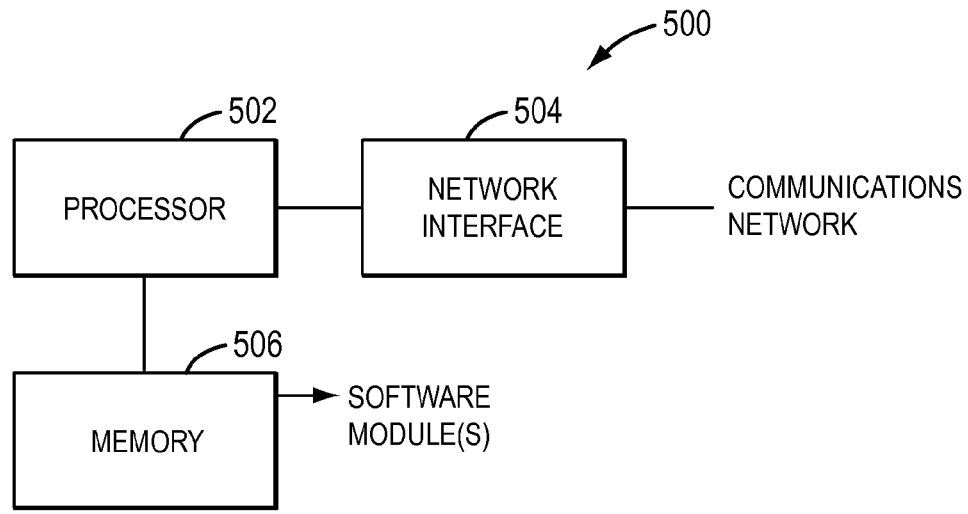
FIG. 5A illustrates a block diagram of an exemplary voice over Internet Protocol (VoIP) server in accordance with another embodiment of the invention.

FIG. 5A illustrates a block diagram of an exemplary voice over Internet Protocol (VoIP) server 500 in accordance with another embodiment of the invention. The VoIP server 500 may be an exemplary detailed version of the VoIP server 110 of wireless communication system 100. As detailed below, the VoIP server 110 assists in the switching of a half duplex communication session to a full duplex communication session.

In particular, the VoIP server 500 comprises a processor 502, a network interface 504 coupled to the processor 502, and a memory 506 coupled to the processor 502. The processor 502, under the control of one or more software module(s) stored in the memory 506, performs the various operations of the VoIP server 500 including the switching of a half duplex communication session to a full duplex communication session. The network interface 504 provides an interface to the communications network 102 for transmitting communications thereto and receiving communications therefrom. The memory 506 could be any computer readable medium (e.g., volatile or non-volatile memory) capable of storing one or more software module(s) that controls the processor 502 in performing its various operations. The following describes a couple of exemplary methods of assisting in the switching of a half duplex communication session to a full duplex communication session.

Figure 5C:
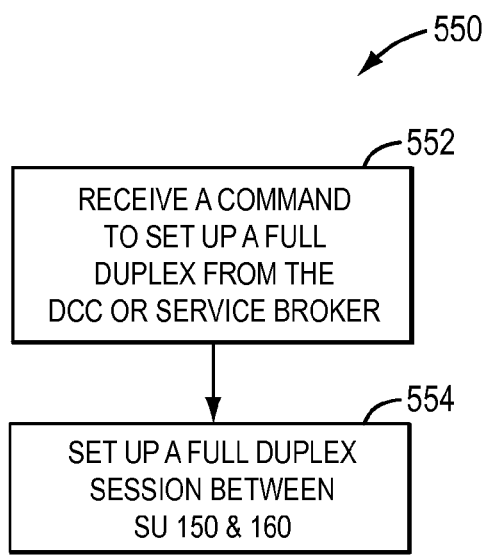
FIG. 5C illustrates a flow diagram of another exemplary method of assisting in the switching of a half duplex communication session to a full duplex communication session performed by the VoIP server in accordance with another embodiment of the invention.
Figure 5B:
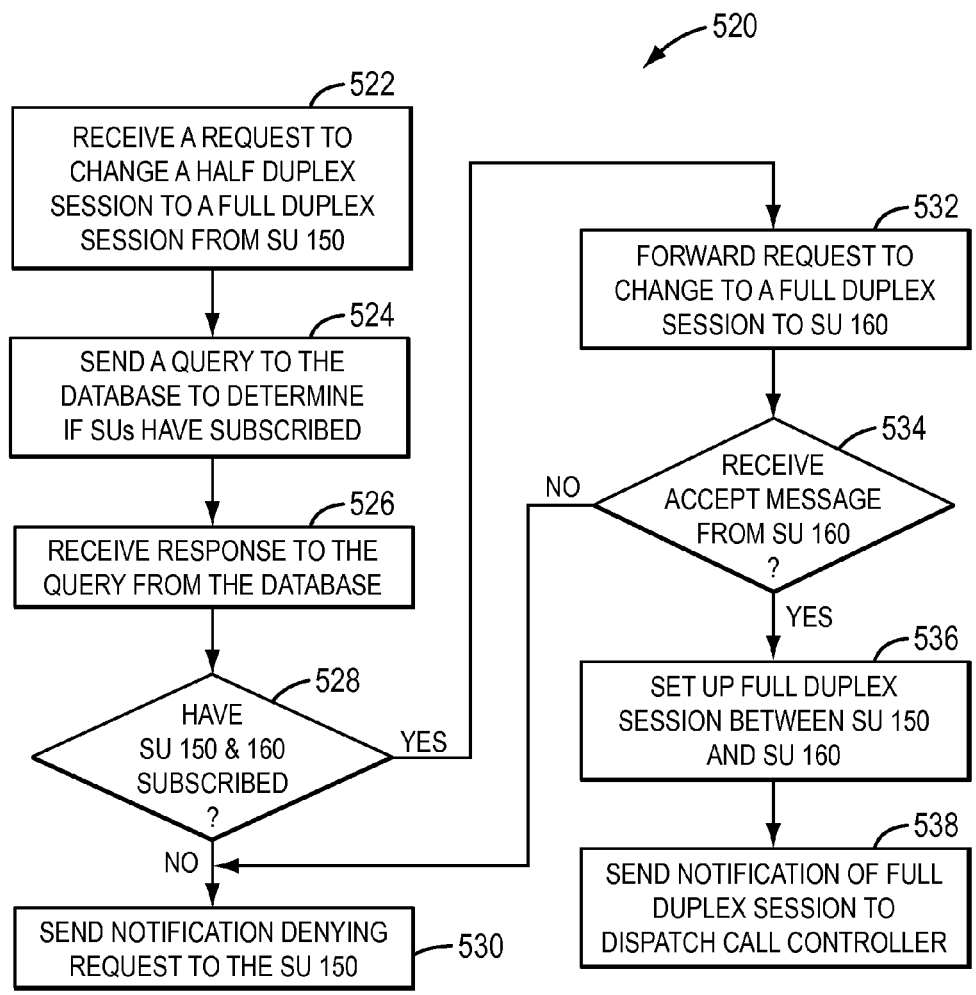
FIG. 5B illustrates a flow diagram of an exemplary method of assisting in the switching of a half duplex communication session to a full duplex communication session performed by the VoIP server in accordance with another embodiment of the invention.

FIG. 5B illustrates a flow diagram of an exemplary method 520 of assisting in the switching of a half duplex communication session to a full duplex communication session performed by the VoIP server 500 in accordance with another embodiment of the invention. As in the previous examples, SU 150 is initiating a request to switch a current half duplex communication session to a full duplex communication session. Further, in this example, the VoIP server 500 is primarily involved in the switching of the half duplex session to the full duplex session.

According to the method 520, the processor 502 receives a request to change a half duplex session to a full duplex session from the SU 150 by way of the network interface 504 (block 522). In response to receiving the request, and if the subscription information is not available in memory 506, the processor 502 sends a query to the subscriber profile database 106 via the network interface 504 to determine whether the originating SU 150 and/or the target SU 160 have subscribed to the half-to-full duplex switching service (block 524). Thereafter, the processor 502 receives the response to the query from the subscriber profile database 106 by way of the network interface 504 (block 562).

If the processor 502, based on the query response, determines that the SU 150 and/or the target SU 160 have not subscribed to the half-to-full duplex switching service (block 528), the processor 502 sends a notification denying the switching request to the SU 150 by way of the network interface 504 (block 530). On the other hand, if the processor 502 determines that the SU 150 and/or SU 160 have subscribed to the half-to-full duplex switching service (block 528), the processor 502 forwards the request to change to a full duplex session to the target SU 160 by way of the network interface 504 (block 532). The request may cause the target SU 160 to generate a visual, audio, and/or vibrating notification to the user. The processor 502 may cause the originating SU 150 to generate a visual, audio, and/or vibrating notification informing the user that the target SU 160 is being contacted.

After forwarding the request to the target SU 160, the processor 502 determines whether the target SU 160 has accepted the request to switch to a full duplex session (block 534). As an example, if the target SU 160 accepts, the processor 502 receives an acceptance message from the target SU 160 by way of the network interface 504. If the target SU 160 does not accept, the processor 502 may receive a deny request message from the target SU 160 via the network interface 504, or may not receive any message from the target SU 160 within a predetermined time period.

If the target SU 160 does not accept, the processor 502 sends a notification denying the switching request to the originating SU 150 via the network interface 504 (block 530). If, on the other hand, the target SU 160 accepts the request to switch to a full duplex session, the processor 502 sets up the full duplex session between the SUs 150 and 160 (block 536). The processor 502 also sends a notification of the switch to the full duplex session to the dispatch call controller 104 via the network interface 504 and optionally via the service broker 108 (block 538). This notification serves to instruct the dispatch call controller 104 to terminate the half duplex communication session.

FIG. 5C illustrates a flow diagram of another exemplary method 550 of assisting in the switching of a half duplex communication session to a full duplex communication session performed by the VoIP server 500 in accordance with another embodiment of the invention. As in the previous examples, the SU 150 is initiating a request to switch a current half duplex communication session to a full duplex communication session. Further, in this example, the dispatch call controller 104 or the service broker 108 is primarily involved in the switching of the half duplex session to the full duplex session, and the VoIP server 500 is responding to either of them.

According to the method 550, the processor 502 receives a command to set up a full duplex session from the dispatch call controller 104 or service broker 108 via the network interface 504 (block 552). In response to the command, the processor 502 sets up a full duplex session between SU 150 and 160 (block 554). In the case of the service broker 108, the processor 502 may have initially received the half-to-full switching request from the originating SU 150 via the network interface 504, and forward the request to the service broker 108 via the network interface 504 for processing. Upon successful setup of the full duplex communication session, the processor 502 sends a notification of such to the service broker 108 via the network interface 504.

Figure 6A:
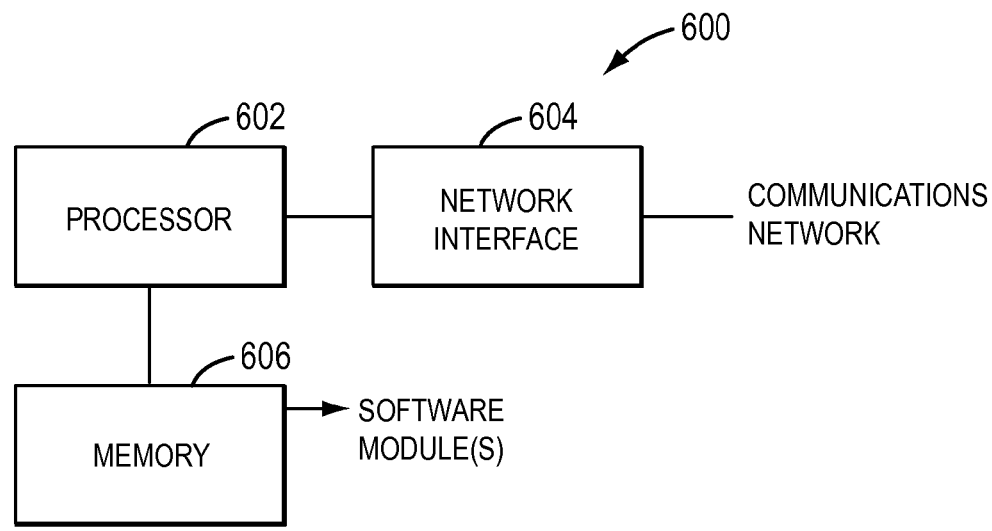
FIG. 6A illustrates a block diagram of an exemplary dispatch call controller in accordance with another embodiment of the invention.

FIG. 6A illustrates a block diagram of an exemplary dispatch call controller 600 in accordance with another embodiment of the invention. The dispatch call controller 600 may be an exemplary detailed version of the dispatch call controller 104 of wireless communication system 100. As detailed below, the dispatch call controller 600 assists in the switching of a half duplex communication session to a full duplex communication session.

In particular, the dispatch call controller 600 comprises a processor 602, a network interface 604 coupled to the processor 602, and a memory 606 coupled to the processor 602. The processor 602, under the control of one or more software module(s) stored in the memory 606, performs the various operations of the dispatch call controller 600 such as assisting in the switching of a half duplex communication session to a full duplex communication session. The network interface 604 provides an interface to the communications network 102 for transmitting communications thereto and receiving communications therefrom. The memory 606 could be any computer readable medium (e.g., volatile or non-volatile memory) capable of storing one or more software module(s) that controls the processor 602 in performing its various operations. The following describes a couple of exemplary methods of assisting in the switching of a half duplex session to a full duplex session.

Figure 6B:
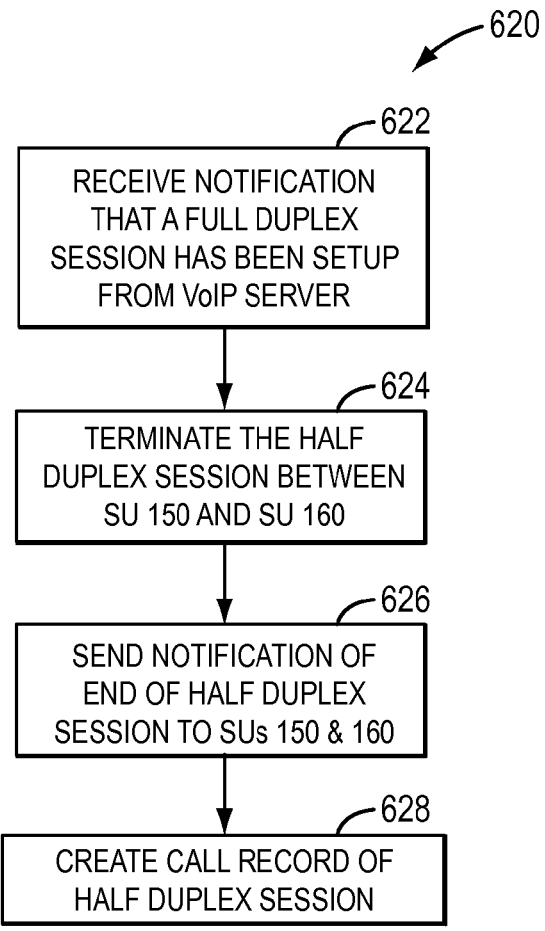
FIG. 6B illustrates a flow diagram of an exemplary method of assisting in the switching of a half duplex communication session to a full duplex communication session performed by the dispatch call controller in accordance with another embodiment of the invention.

FIG. 6B illustrates a flow diagram of an exemplary method 620 of assisting in the switching of a half duplex communication session to a full duplex communication session performed by the dispatch call controller 600 in accordance with another embodiment of the invention. As in the previous examples, SU 150 is initiating a request to switch a current half duplex communication session to a full duplex communication session. Further, in this example, the VoIP server 110 or service broker 108 is primarily involved in the switching of the half duplex session to the full duplex session, and the dispatch call controller 600 is responding to either of them.

According to the method 620, the processor 602 receives a notification that a full duplex session has been setup or is to be set up from the VoIP server 110 via the network interface 604 (block 622). In the case of the service broker 108, it may be a notification to terminate the half duplex communication session. In response to the notification, the processor 602 terminates the half duplex communication session between the SUs 150 and 160 (block 624). The processor 626 then sends a notification of the termination of the half duplex session to the SUs 150 and 160 and to the service broker 108 via the network interface 604 (block 626). The processor 628 then creates a call record of the half duplex communication session (block 628).

Figure 6C:
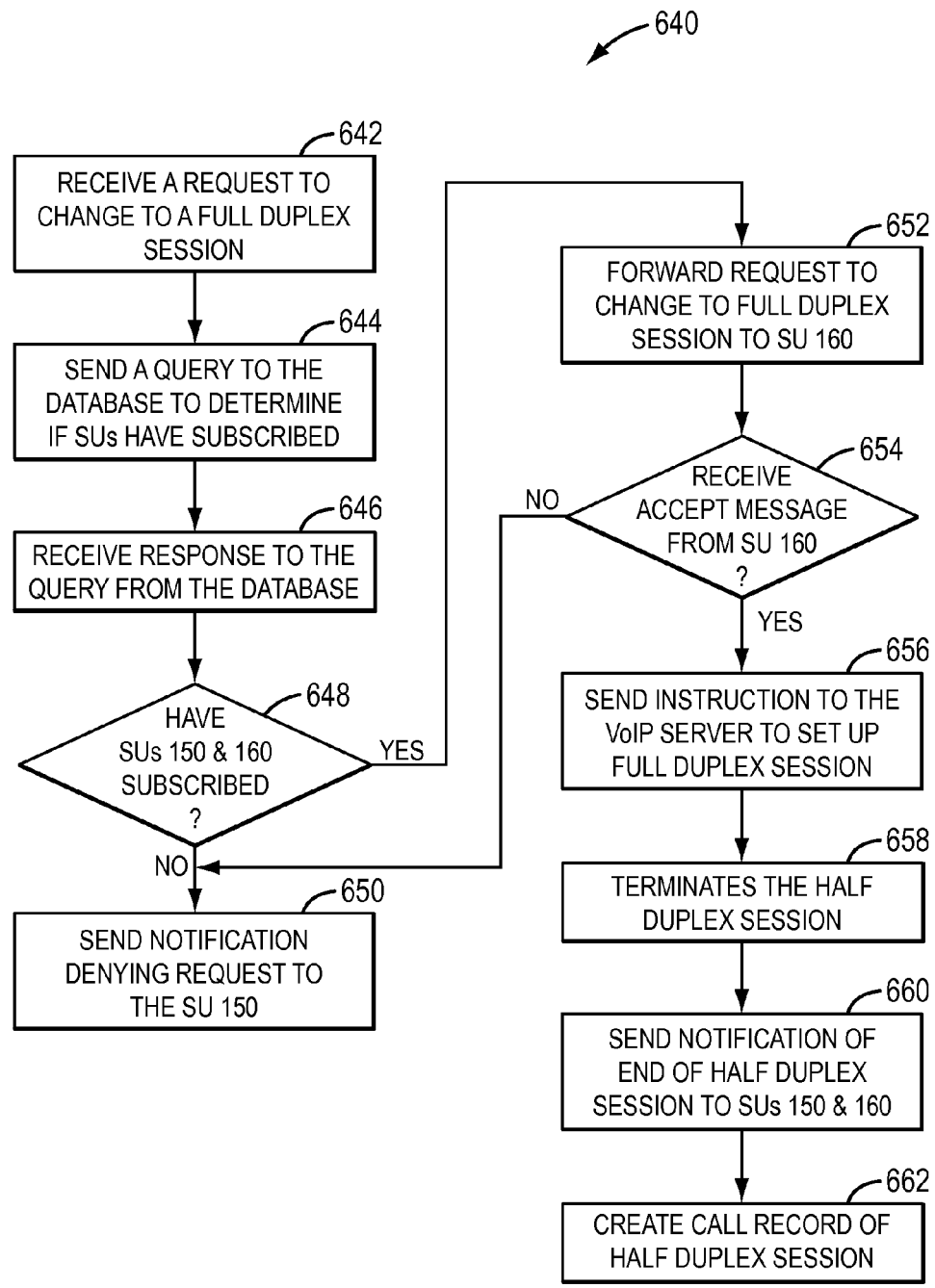
FIG. 6C illustrates a flow diagram of another exemplary method of assisting in the switching of a half duplex communication session to a full duplex communication session performed by the dispatch call controller in accordance with another embodiment of the invention.

FIG. 6C illustrates a flow diagram of another exemplary method 640 of assisting in the switching of a half duplex communication session to a full duplex communication session performed by the dispatch call controller 600 in accordance with another embodiment of the invention. As in the previous examples, SU 150 is initiating a request to switch a current half duplex communication session to a full duplex communication session. Further, in this example, the dispatch call controller 600 is primarily involved in the switching of the half duplex session to the full duplex session.

According to the method 640, the processor 602 receives a request to change a half duplex session to a full duplex session from the SU 150 by way of the network interface 604 (block 642). In response to receiving the request, and if the subscription data is not available locally in memory 606, the processor 602 sends a query to the subscriber profile database 106 via the network interface 604 to determine whether the originating SU 150 and/or the target SU 160 have subscribed to the half-to-full duplex switching service (block 644). Thereafter, the processor 602 receives the response to the query from the subscriber profile database 106 by way of the network interface 604 (block 646).

If the processor 602, based on the query response, determines that the SU 150 and/or the target SU 160 have not subscribed to the half-to-full duplex switching service (block 648), the processor 602 sends a notification denying the switching request to the SU 150 by way of the network interface 604 (block 650). If, on the other hand, the processor 602 determines that the SU 150 and/or SU 160 have subscribed to the half-to-full duplex switching service (block 648), the processor 602 forwards the request to change to a full duplex session to the target SU 160 by way of the network interface 604 (block 652). The request may cause the target SU 160 to generate a visual, audio, and/or vibrating notification to the user. The processor 602 may cause the originating SU 150 to generate a visual, audio, and/or vibrating notification informing the user that the target SU 160 is being paged.

After forwarding the request to the target SU 160, the processor 602 determines whether the target SU 160 has accepted the request to switch to a full duplex session (block 654). As an example, if the target SU 160 accepts, the processor 602 receives an acceptance message from the target SU 160 by way of the network interface 604. If the target SU 160 does not accept, the processor 602 may receive a deny request message from the target SU 160 via the network interface 604, or may not receive any message from the target SU 160 within a predetermined time period.

If the target SU 160 does not accept, the processor 602 sends a notification denying the switching request to the originating SU 150 via the network interface 604 (block 650). If, on the other hand, the target SU 160 accepts the request to switch to a full duplex session, the processor 602 sends an instruction to set up the full duplex session between the SUs 150 and 160 to the VoIP server 110 via the network interface 604 and optionally via the service broker 108 (block 656). The processor 602 then terminates the half duplex session (block 658), and sends a notification of such to the SUs 150 and 160 and the service broker 108 via the network interface 604 (block 660). The processor 602 then creates a call record of the half duplex session (block 662).

Figure 7A:
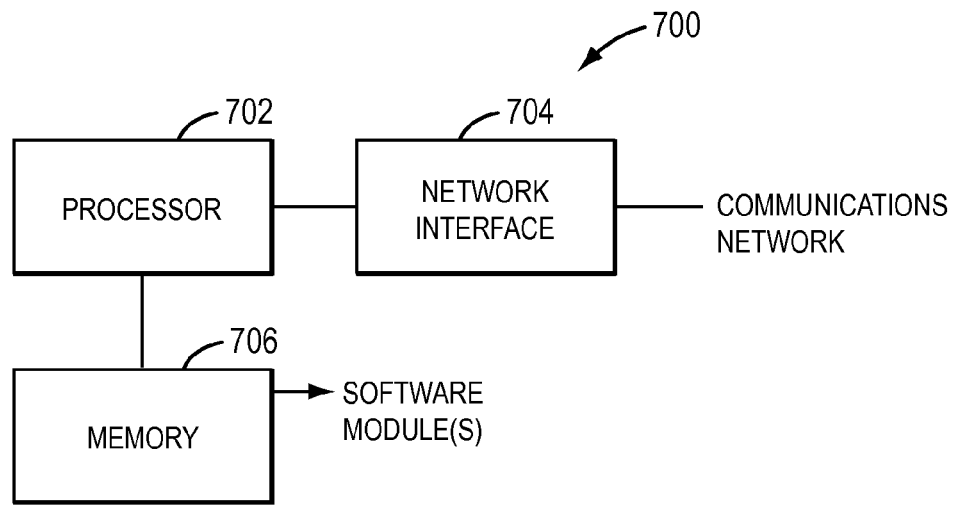
FIG. 7A illustrates a block diagram of an exemplary service broker in accordance with another embodiment of the invention.

FIG. 7A illustrates a block diagram of an exemplary service broker 700 in accordance with another embodiment of the invention. The service broker 700 may be an exemplary detailed version of the service broker 108 previously discussed with reference to the wireless communication system 100. As discussed below, the service broker 800 assists in the switching of a half duplex communication session to a full duplex communication session.

In particular, the service broker 700 comprises a processor 702, a network interface 704 coupled to the processor 702, and a memory 706 coupled to the processor 702. The processor 702, under the control of one or more software module(s) stored in the memory 706, performs the various operations of the service broker 700 such as assisting in the switching of a half duplex communication session to a full duplex communication session. The network interface 704 provides an interface to the communications network 102 for transmitting communications thereto and receiving communications therefrom. The memory 706 could be any computer readable medium (e.g., volatile or non-volatile memory) capable of storing one or more software module(s) that controls the processor 702 in performing its various operations. The following describes an exemplary method of assisting in the switching of a half duplex session to a full duplex session.

Figure 7B:
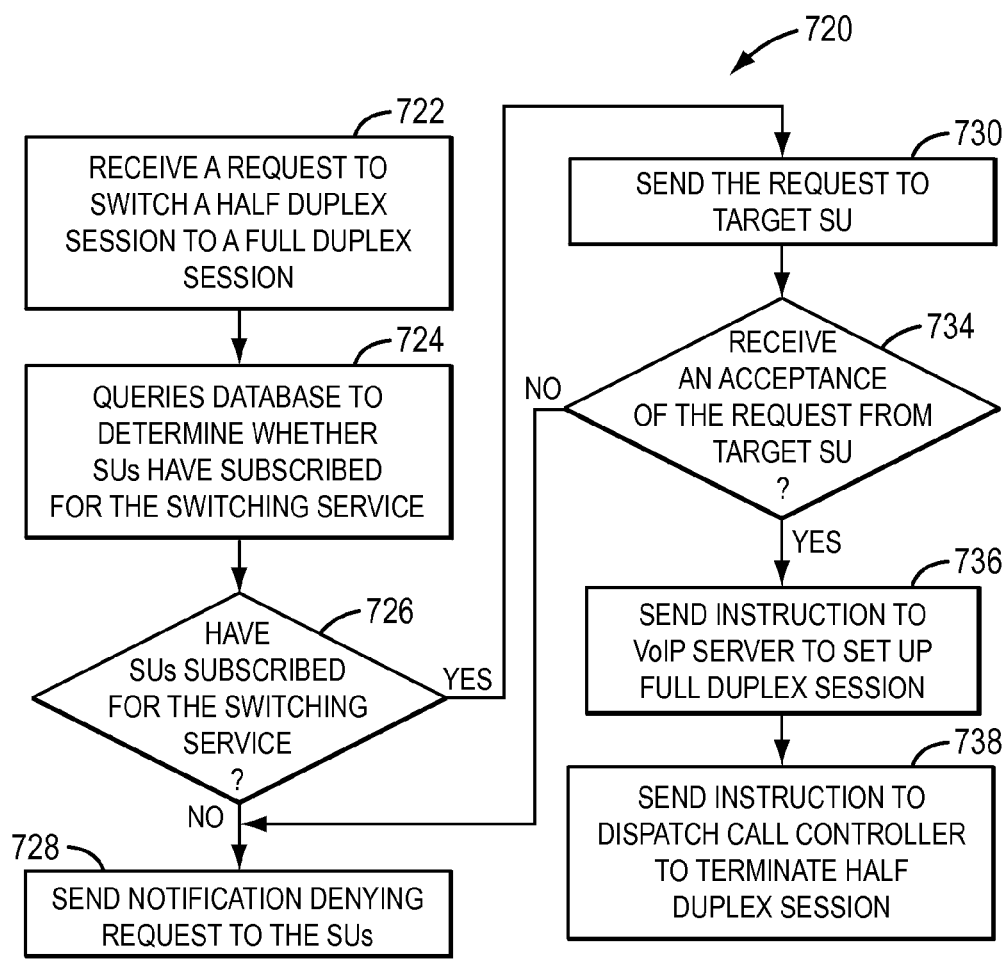
FIG. 7B illustrates a flow diagram of an exemplary method of assisting in the switching of a half duplex communication session to a full duplex communication session performed by the service broker in accordance with another embodiment of the invention.

FIG. 7B illustrates a flow diagram of an exemplary method 720 of assisting in the switching of a half duplex communication session to a full duplex communication session performed by the service broker 700 in accordance with another embodiment of the invention. In this example, SUs 150 and 160 are currently participating in a half duplex communication session.

According to the method 720, the processor 702 receives a request to switch the half duplex session between SUs 150 and 160 to a full duplex communication session via the network interface 704 (block 722). The request may be received from the originating SU 150 via a VoIP server or dispatch call controller. In response to the request, the processor 702 queries a database containing subscriber profile information to determine whether the originating SU 150 and/or the target SU 160 have subscribed for the half-to-full switching services (block 724). The database may be stored locally in the memory 706 or in an external device, such as the subscribe profile database 106.

If the processor 702 determines that the SUs 150 and/or 160 have not subscribed to the switching service (block 726), the processor 702 sends a notification denying the request to the originating SU 150 via the network interface 704 and the device (e.g., VoIP server or dispatch call controller) that had originally forwarded the request to the service broker 700 (block 728). If, on the other hand, the processor 702 determines that the SUs 150 and/or 160 have subscribed to the switching service (block 726), the processor 702 sends the request to switch to the full duplex session to the target SU 160 via the network interface 704 (block 730). The processor 702 then determines whether it has received the acceptance of the request from the target SU 160 (block 734). If the processor 702 did not receive the acceptance from the target SU 160

(by, for example, receiving a denial of the request or by not receiving a response to the request within a predetermined time period after sending the request to the target SU), the processor 702 sends a notification denying the request to switch to the full duplex session to the originating SU 150 via the network interface 704 (block 728).

If, on the other hand, the processor 702 receives the acceptance of the request from the target SU 160 via the network interface 704, the processor 702 sends an instruction to set up the full duplex communication session to the VoIP server via the network interface 704 (block 736). The processor 702 also sends an instruction to terminate the half duplex communication session to the dispatch call controller via the network interface 704 (block 738).

Figure 8A:
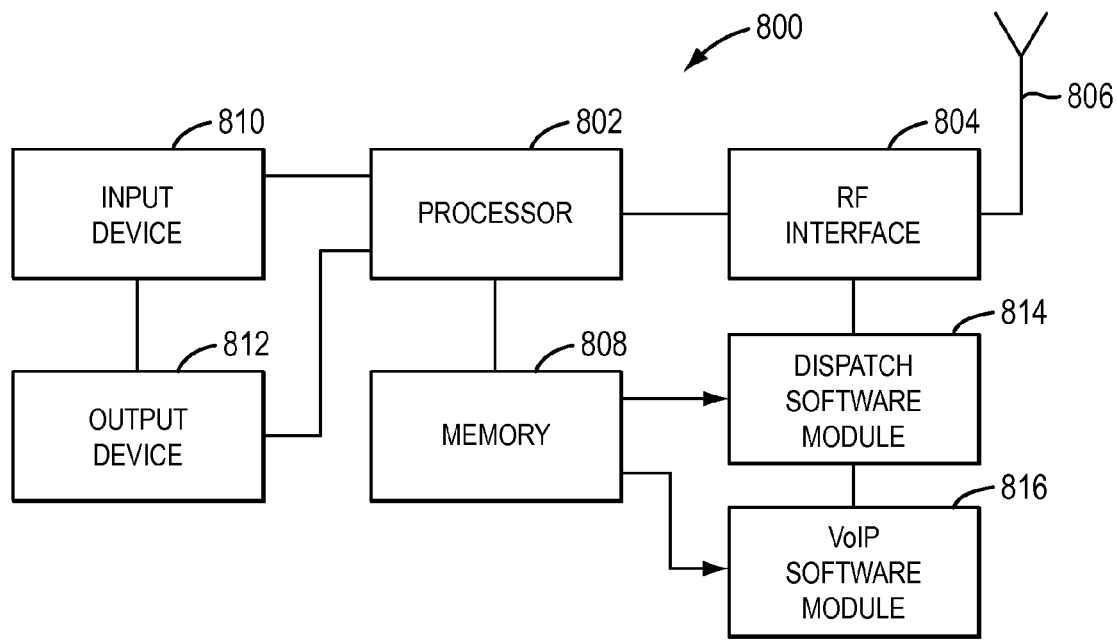
FIG. 8A illustrates a block diagram of an exemplary subscriber unit (SU) in accordance with another embodiment of the invention.

FIG. 8A illustrates a block diagram of an exemplary subscriber unit (SU) 800 in accordance with another embodiment of the invention. The SU 800 may be an exemplary detailed version of the SUs 150 and/or 160 previously discussed with reference to the wireless communication system 100. As detailed below, the SU 800 initiates a switch from a half duplex communication session to a full duplex communication session, and responds to a request to switch from a half duplex communication session to a full duplex communication session.

In particular, the SU 800 comprises a processor 802, a radio frequency (RF) interface 804 coupled to the processor 802, an antenna 806 coupled to the RF interface 804, a memory 808 coupled to the processor 802, an input device 810 coupled to the processor 802, and an output device 812 coupled to the processor 802. The processor 802, under the control of one or more software module(s), such as a dispatch software module 814 and a VoIP software module 816, stored in the memory 808, performs the various operations of the SU 800 such as initiating and responding to a switch of a half duplex communication session to a full duplex communication session. The RF interface 804 including the antenna 806 provides an interface to the wireless medium to send and receive communications to and from the wireless communication system 100. If the SU 800 is a dispatch-to-desktop device, the RF interface 804 and antenna 806 may be instead a network interface.

The memory 808 could be any computer readable medium (e.g., volatile or non-volatile memory) capable of storing one or more software module(s), such as the dispatch software module 814 and the VoIP software module 816, that controls the processor 802 in performing its various operations. The software modules 814 and 816 could be based on any programming language, such as Java, C, C++, etc. The input device 810 allows a user to provide instructions and information to the processor 802, and may include a keyboard, pointing device, microphone, etc. The output device allows the processor 802 to send instructions and information to the user, and may include a display, speaker, vibrating unit, etc. The following describes a couple of exemplary methods of initiating a switch from a half duplex session to a full duplex session, and an exemplary method of responding to a request to switch from a half duplex session to a full duplex session.

Figure 8B:
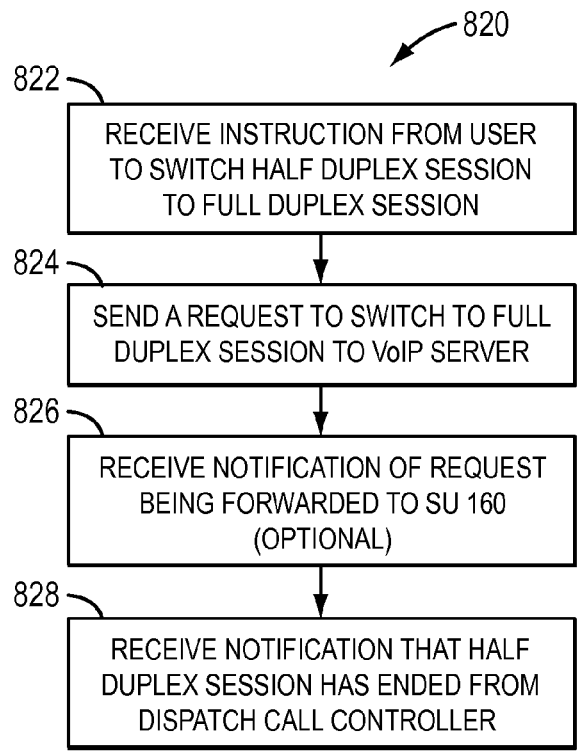
FIG. 8B illustrates a block diagram of an exemplary method of initiating a switch from a half duplex communication session to a full duplex communication session performed by the subscriber unit (SU) in accordance with another embodiment of the invention.

FIG. 8B illustrates a block diagram of an exemplary method 820 of initiating a switch from a half duplex communication session to a full duplex communication session performed by the SU 800 in accordance with another embodiment of the invention. In this example, the SU 800 is currently in a half duplex session with another target unit. In addition, the SU 800 is initiating a switch from the half duplex session to a full duplex session. According to the method 820, the processor 802 receives an instruction to switch to a full duplex session from the user via the input device 810 (block 822).

The dispatch software module 814 may process the request to switch to a full duplex session. In response, the processor 802 sends a request to switch to a full duplex session to the VoIP server 110 by way of the RF interface 804 and antenna 806 (block 824). In this respect, the dispatch software module 814 contacts the VoIP software module 816 to send the request to the VoIP server 110.

When the wireless communication system 100 forwards the request to switch to a full duplex session to the target unit, the processor 802 may receive instruction from the VoIP server 110 via the antenna 806 and RF interface 804, to generate a visual, audio, and/or vibrating notification at the output device 812 indicating that the request is being sent to the target unit (block 826). The VoIP software module 816 may be responsible for generating this notification. The VoIP software module may also notify the dispatch software module of the received request. Then, subsequently, the processor 802 receives a notification that the half duplex session has been terminated from the dispatch call controller via the antenna 806 and RF interface 804 (block 828). The processor 802 may notify the user of the ending of the half duplex session via the output device 812. The dispatch software module 814 may be responsible for generating this notification. Alternatively, the acceptance is received by the VoIP software module which would then initiate the full duplex session with the target. To optimize the implementation, the request to switch and set up the full duplex call session can be combined into a single message.

FIG. 8C illustrates a flow diagram of another exemplary method 830 of initiating a switch from a half duplex communication session to a full duplex communication session performed by the SU 800 in accordance with another embodiment of the invention. In this example, the SU 800 is currently in a half duplex session with another target unit. In addition, the SU 800 is initiating a switch from the half duplex session to a full duplex session. According to the method 830, the processor 802 receives an instruction to switch to a full duplex session from the user via the input device 810 (block 832). In response, the processor 802 sends a request to switch to a full duplex session to the dispatch call controller 110 by way of the RF interface 804 and antenna 806 (block 834). The dispatch software module 814 is responsible for performing the operations specified in blocks 832 and 834.

When the wireless communication system 100 forwards the request to switch to a full duplex session to the target unit, the processor 802 may receive instruction from the dispatch call controller 110 via the antenna 806 and RF interface 804, to generate a visual, audio, and/or vibrating notification at the output device 812 indicating that the request is being sent to the target unit (block 836). The dispatch software module 816 is responsible for generating this notification. Then, subsequently, the processor 802 receives a notification that the half duplex session has been terminated from the dispatch call controller via the antenna 806 and RF interface 804 (block 838). The processor 802 may notify the user of the ending of the half duplex session via the output device 812. The dispatch software module 814 may be responsible for generating this notification. Alternatively, upon receiving the acceptance, the dispatch software module may notify the VoIP software module which may then initiate the full duplex session.

FIG. 8D illustrates a flow diagram of another exemplary method 840 of responding to a request to switch from a half duplex session to a full duplex session performed by the SU 800 in accordance with another embodiment of the invention. In this example, the SU 800 is currently in a half duplex session with another unit. In addition, the SU 800 is receiving a request to switch from the half duplex session to a full duplex session from the other unit.

According to the method 840, the processor 802 receives a request to switch to a full duplex session from the VoIP server 110 or the dispatch call controller 104 (block 842). If the request is received from the VoIP server 110, the VoIP software module 816 receives the request and notifies the dispatch software module 814. If, on the other hand, the request is received from the dispatch call controller 104, the dispatch software module 814 receives the request. Depending upon the manual or automatic setting, the processor 802 waits for a user response or automatically accepts the request. In the case of manual setting, manual acceptance is via a key press, which is received by the dispatch software module 814, which forwards it to the dispatch call controller 104 if the original request is received via the dispatch call controller 104. If the original request is received from the VoIP software module 816, the dispatch software module 814 notifies the VoIP software module 816 of the acceptance, which then responds to the VoIP server 110. In the case of sending the acceptance to the VoIP server 110, the dispatch software module 814 may contact the VoIP software module 816 to send the acceptance of the request to the VoIP server 110. Otherwise, the dispatch software module 814 handles the acceptance of the request. The processor 802 then receives a notification of the termination of the half duplex session from the dispatch call controller 104 via the antenna 806 and RF interface 804 (block 846). The processor 802 may notify the user of the ending of the half duplex session via the output device 812.

While the invention has been described in connection with various embodiments, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A communication system, comprising:
    a network;
    a first network device coupled to said network, wherein said first network device is adapted to set up a half duplex communication session between first and second subscriber units (SUs);
    a voice over Internet Protocol (VoIP) server coupled to said network, wherein said VoIP server is adapted to:
        receive a VoIP request to switch said half duplex communication session to a full duplex communication session from said first subscriber unit (SU) by way of said network, while said half duplex communication session is active;
        forward said request to said second subscriber unit (SU) by way of said network;
        receive an acceptance of said request from said second subscriber unit (SU) by way of said network, or receive a denial of said request from said second subscriber unit (SU) by way of said network or receive no acceptance of said request within a predetermined time period;
        set up said full duplex communication session between said first and second subscriber units (SUs) when said acceptance is received; and
        send a first notification denying said request to said first subscriber unit (SU) when said denial is received from said second subscriber unit (SU) or no acceptance of said request is received within said predetermined time period.

2. The communication system of claim 1, wherein said first network device comprises a dispatch call controller.

3. The communication system of claim 1, wherein said VoIP server is further adapted to send a second notification related to said set up of said full duplex session to said first network device by way of said network.

4. The communication system of claim 3, further comprising a third network device, wherein said VoIP server is adapted to send said second notification to said first network device also by way of said third network device.

5. The communication system of claim 4, wherein said third network device comprises a service broker.

6. The communication system of claim 4, wherein said first network device is further adapted to terminate said half duplex communication session in response to receiving said second notification.

7. The communication system of claim 6, wherein said first network device is further adapted to send a third notification indicating said termination of said half duplex communication session to at least one of said first and/or said second subscriber units (SUs) by way of said network.

8. The communication system of claim 6, wherein said first network device is adapted to create a call record of said half duplex communication session.

9. A communication system, comprising:
    a network:
    a first network device coupled to said network, wherein said first network device is adapted to set up a half duplex communication session between first and second subscriber units (SUs);
    a voice over Internet Protocol (VoIP) server coupled to said network, wherein said VoIP server is adapted to:
        receive VoIP request to switch said half duplex communication session to a full duplex communication session from said first subscriber unit (SU) by way of said network, while said half duplex communication session is active;
        forward said request to said second subscriber unit (SU) by way of said network;
        receive an acceptance of said request from said second subscriber unit (SU) by way of said network, or receive a denial of said request from said second subscriber unit (SU) by way of said network or receive no acceptance of said request within a predetermined time period; and
        set up said full duplex communication session between said first and second subscriber units (SUs) if said acceptance is received; or
        send a first notification denying said request to said first subscriber unit (SU) if said denial is received from said second subscriber unit (SU) or no acceptance of said request is received within said predetermined time period, wherein said VoIP server is further adapted to determine whether at least one of said first and/or said second subscriber units (SUs) have subscribed to receive said switch from said half duplex communication session to said full duplex communication session.

10. The communication system of claim 9, further comprising a third network device containing subscriber profile information, wherein said VoIP server IS adapted to determine whether said first and/or said second subscriber units (SUs) have subscribed to receive said switch from said half duplex communication session to said full duplex communication session by:
    sending a query to said third network device by way of said network; and receiving a response from said third network device by way of said network, wherein said response includes information indicating whether at least one of said first and/or second subscriber units (SUs) have subscribed to receive said switch from said half duplex communication session to said full duplex communication session.

11. A communication system, comprising:
a network;
a voice over Internet Protocol (VoIP) server coupled to said network;
a service broker coupled to said network; and
a dispatch call controller coupled to said network, wherein said dispatch call controller is adapted to:
set up a half duplex communication session between first and second subscriber units (SUs);
receive VoIP request to switch said half duplex communication session to a full duplex communication session from said first subscriber unit (SU) by way of said network, while said half duplex communication session is active;
forward said request to said second subscriber unit (SU) by way of said network;
receive an acceptance of said request from said second subscriber unit (SU) by way of said network, or receive a denial of said request from said second subscriber unit (SU) by way of said network or receive no acceptance of said request within a predetermined time period;
send a first notification to said VoIP server by way of said service broker when said acceptance of said request is received, wherein said VoIP server is adapted to set up said full duplex communication session in response to receiving said first notification; and
send a second notification denying said request to said first subscriber unit (SU) by way of said network when said denial of said request is received from said second subscriber unit (SU) or no acceptance of said request is received within said predetermined time period.

12. The communication system of claim 11, wherein said dispatch call controller IS further adapted to terminate said half duplex communication session.

13. The communication system of claim 12, wherein said dispatch call controller is further adapted to send a third notification indicating said termination of said half duplex communication session to said first and/or second subscriber units (SUs) by way of said network.

14. The communication system of claim 12, wherein said VoIP server is adapted to create a call record of said half duplex communication session.

15. A communication system, comprising:
a network;
a dispatch call controller coupled to said network, wherein said dispatch call controller is adapted to set up a half duplex communication session between first and second subscriber units (SUs);
a voice over Internet Protocol (VoIP) server coupled to said network, wherein said voice over Internet Protocol (VoIP) server is adapted to set up a full duplex communication session between first and second subscriber units (SUs); and
a service broker coupled to said network, wherein said service broker is adapted to:
receive VoIP request to switch said half duplex communication session to said full duplex communication session from said first subscriber unit (SU) by way of said network, while said half duplex communication session is active;
forward said request to said second subscriber unit (SU) by way of said network;
receive an acceptance of said request from said second subscriber unit (SU) by way of said network, or receive a denial of said request from said second subscriber unit (SU) by way of said network or receive no acceptance of said request within a predetermined time period; and
send a first message to said VoIP server to set up said full duplex communication session between said first and second subscriber units (SUs) and send a second message to said dispatch call controller to terminate said half duplex communication session, when said acceptance is received.

16. The communication system of claim 15, wherein said service broker is further adapted to query a subscriber database to determine whether at least one of said first and/or second subscriber units (SUs) are eligible to have said half duplex communication switched to said full duplex communication session.

17. The communication system of claim 15, further comprising a fourth network device containing subscriber profile information, wherein said service broker is adapted to determine whether at least one of said first and/or second subscriber units (SUs) have subscribed to receive said switch from said half duplex communication session to said full duplex communication session by:
sending a query to said fourth network device by way of said network; and
receiving a response from said fourth network device by way of said network, wherein said response includes information indicating whether at least one of said first and/or second subscriber units (SUs) have subscribed to receive said switch from said half duplex communication session to said full duplex communication session.

18. The communication system of claim 15, wherein said service broker is adapted to receive said request by way of said dispatch call controller or said VoIP server.

19. A method, comprising:
receiving, by a voice over Internet Protocol (VoIP) server, VoIP request to switch a half duplex communication session to a full duplex communication session from a first subscriber unit (SU);
determining, by the VoIP server, whether the first subscriber unit has a subscription to a service for switching from a half duplex communication session to a full duplex communication session, wherein when the first subscriber unit has the subscription, the method further comprising
forwarding, by the VoIP server, said request to switch from said half duplex communication session to said full duplex communication session to a second subscriber unit (SU);
receiving, by the VoIP server, an acceptance of said request from said second subscriber unit (SU); and
setting up, by the VoIP server, said full duplex communication session between said first and second subscriber units (SUs) if said acceptance of said request is received.

20. The method of claim 19, further comprising sending a notification to a network device for ending said half duplex communication session.

* * * * *